R. HUFF.
MOTOR VEHICLE.
APPLICATION FILED JULY 27, 1912.
1,142,257.
Patented June 8, 1915.
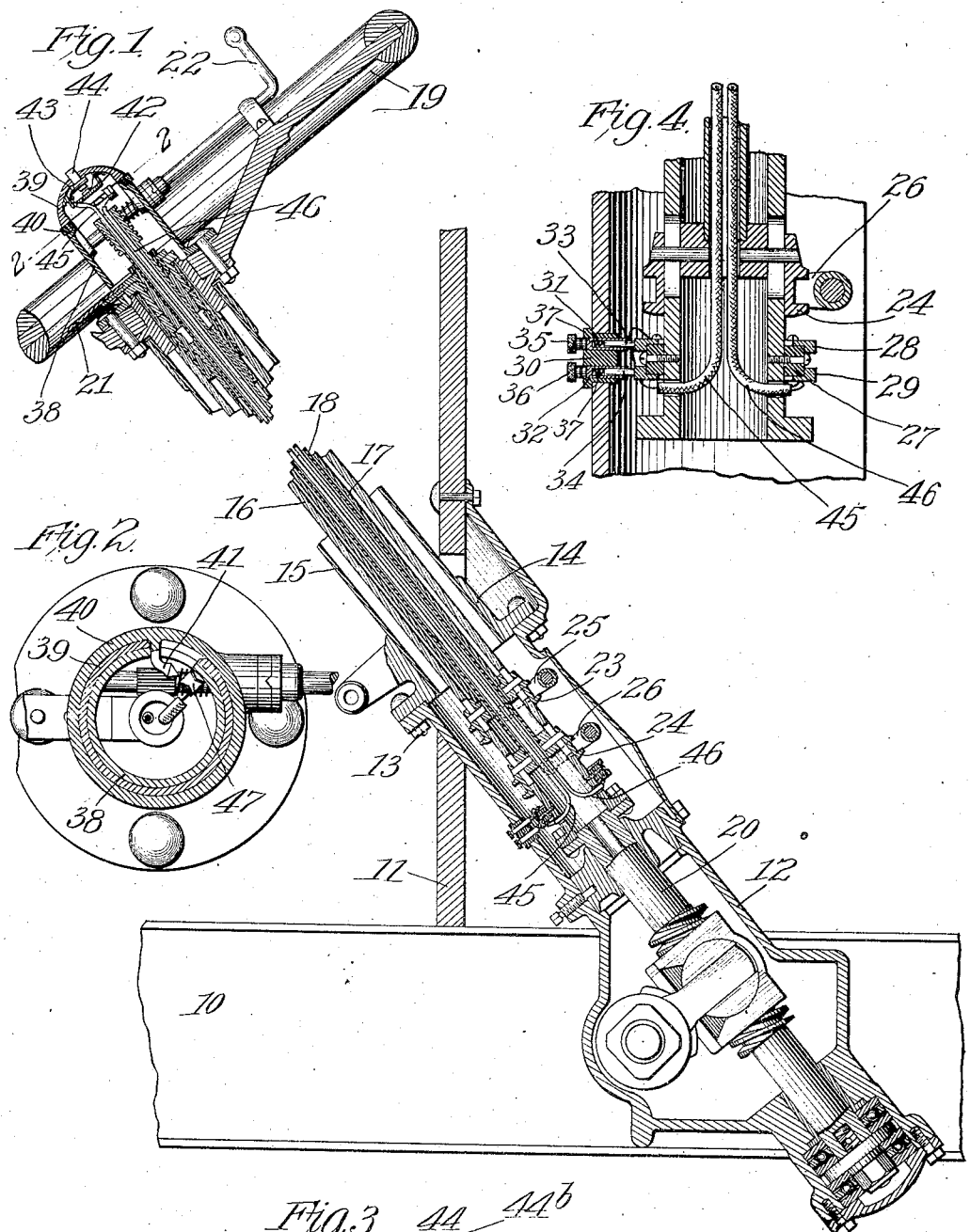

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,142,257. Specification of Letters Patent. Patented June 8, 1915.

Application filed July 27, 1912. Serial No. 711,881.

*To all whom it may concern:*

Be it known that I, RUSSELL HUFF, a citizen of the United States, residing at Detroit, Wayne county, State of Michigan, have invented certain new and useful Improvements in Motor-Vehicles, of which the following is a specification.

This invention relates to motor vehicles and more particularly to the steering column and the means for mounting certain accessories on the steering column.

Motor vehicles are now commonly equipped with electrically operated signaling devices such as horns, etc., and one of the objects of this invention is to provide, on the steering column, a neat and convenient contact device for operating the signal device, and another object of the invention is to provide a neat, compact and convenient contact device for opening and closing the ignition circuit of the motor.

Other objects and the features of novelty will be apparent from the following description taken in connection with the accompanying drawings, in which:

Figure 1 is a vertical longitudinal section of a steering column embodying the invention. Fig. 2 is an enlarged transverse section on the line 2—2 of Fig. 1. Fig. 3 is an enlarged fragmentary vertical section of the upper end of the steering column. Fig. 4 is an enlarged vertical section showing certain details appearing in Fig. 1.

Referring to the drawings 10 indicates a portion of the vehicle frame on which is mounted the dash 11. A casing 12 is secured to the frame 10 and the dash 11 in any suitable manner, the upper portion of this casing extending through a suitable opening in the dash as shown in Fig. 1. Secured to the upper end of the casing 12 by means of suitable bolts 13 is a sleeve 14 which has brazed or otherwise rigidly secured therein a tube 15.

Within the tube 15 is arranged the device for steering the vehicle and controlling the throttle and the sparking devices of the motor and, as shown, these devices include concentric tubes 16, 17 and 18, the former of which has secured to its upper end the steering wheel 19 and to its lower end a shaft 20 which may be connected with the steering wheels of the vehicle in any preferred manner. The tube 17 is operatively connected with a lever 21, whereby the tube is moved longitudinally of the steering column to actuate the motor throttle and the tube 18 is operatively connected with the lever 22 whereby the tube is moved longitudinally of the steering column to control the sparking devices of the motor. The tubes 17 and 18 may be connected respectively with the sleeves 23 and 24 arranged on the outside of the tube 16, whereby the movements of the tubes may be transmitted to the levers 25 and 26. The invention is not, however, limited to the arrangement of the tubes 16, 17 and 18 and the manner of actuating these tubes, as these parts are wholly independent of the features of novelty claimed herein, and any preferred mechanisms for accomplishing the same purposes may be used instead.

On the exterior of the tube 16 may be arranged an insulator 27, on which may be mounted the contact rings 28 and 29. An insulator 30 may be secured in the wall of the casing 12 and may have secured thereto the brush holders 31 and 32 for the brushes 33 and 34, the brush 33 contacting with the ring 28 and the brush 34 contacting with the ring 29. The brush holders 31 and 32 may be provided with the thumb screws 35 and 36, respectively, by means of which conductors may be connected with the brush holders, and springs 37 may be arranged in the brush holders to hold the brushes in contact with the rings 28 and 29.

The tube 16 has secured thereto above the hub of the steering wheel 19 a tubular head 38, this head having arranged on its upper end a cap 39 which may be secured to the head 38 in any suitable manner as by means of screw threads. The head 38 and the cap 39 are so formed at their meeting ends as to provide an annular groove in which is arranged a ring 40 which is provided with an inwardly projecting contact finger 41, this finger extending through suitable slots in the head and the cap. A cup or support 42, preferably of insulating material, is secured to the under side of the cap 39 and a spring 43 is secured to the support 42 and extends to a point beneath the push button 44 which projects through the cap preferably on the axis of the steering column. A conductor 45 extends through the tube 18 and is connected at its ends with the spring 43 and the contact ring 28. The push button 44 may be used to control the horn or other signaling device carried by the vehicle and one terminal of the horn circuit may be grounded on the vehicle frame or any other part which is electrically connected with the cap 39 and the other terminal of this circuit may be connected with the brush holder 31 whereby a circuit will be completed when the push button is depressed so as to bring a contact carried by the spring 43 into engagement with a contact 44ª which is carried by the cap 42 and electrically connected with the cap 39 by the conductor 44ᵇ.

A conductor 46 has its upper end secured to a contact member 47 and its lower end connected with the contact ring 29. The contact member 47 is so arranged as to be engaged by the finger 41 when the ring 40 is rotated, these contacts thus forming a switch which may be used to control the ignition circuit of the motor. One terminal of the ignition circuit may be grounded on the vehicle frame or any other part which is electrically connected with the ring 40 and the other terminal of this circuit may be connected with the brush holder 32. By this arrangement the ignition circuit will be completed when the ring 40 is rotated so as to bring the finger 41 into engagement with the contact member 47 and by rotating the ring 40 in the opposite direction the ignition circuit will be broken.

It will be observed that this arrangement of the conductors and switching devices for controlling the circuits above mentioned is very compact and since the parts are thoroughly inclosed there will be little liability of having them deranged. The ring 40 and the push button 44 are also conveniently and neatly arranged and do not in any way interfere with the other control devices which are carried by the steering column.

Having thus described the invention what is claimed as new is:

1. In a motor vehicle steering gear, the combination with the oscillatable steering member having a steering wheel mounted on the upper end thereof, a casing carried by said steering member, a plurality of switches within said casing, and means projecting through said casing and adapted to actuate said switches.

2. In a motor vehicle steering gear, the combination with the oscillatable steering member having a steering wheel mounted on the upper end thereof, of a casing carried by said steering member adjacent said wheel, a switch arranged within said casing, and a ring carried by said casing on the exterior thereof and connected with one terminal of said switch.

3. In a motor vehicle steering gear, the combination with the oscillatable steering member having a steering wheel at the upper end thereof, of a casing carried by said steering member adjacent said wheel, a switch within said casing, and means oscillatable on the exterior of said casing for operating said switch.

4. In a motor vehicle steering gear, the combination with the oscillatable steering member having a steering wheel at the upper end thereof, of a casing carried by said steering member adjacent said wheel, a plurality of switches arranged within said casing, a member projecting through the wall of said casing and adapted to be reciprocated to operate one of said switches, and a member oscillatable on the exterior of said casing for operating another of said switches.

5. In a motor vehicle steering gear, the combination with the oscillatable steering member having a steering wheel at the upper end thereof, a tubular casing secured to said steering member above the point of attachment of the steering wheel, a cap for closing the upper end of said tubular casing, a switch carried by said cap, a second switch arranged within said casing, and a ring arranged on the exterior of said casing and held in position by said cap and adapted to operate said second switch.

In testimony whereof I affix my signature in presence of two witnesses.

RUSSELL HUFF.

Witnesses:
 ALFRED H. KNIGHT,
 ALLEN LOOMIS.